(No Model.)

E. E. MURPHY.
APPARATUS FOR CONCENTRATING VINEGAR.

No. 574,930. Patented Jan. 12, 1897.

WITNESSES:
A. D. Harrison.
A. D. Adams.

INVENTOR:
E. E. Murphy
by Wright Brown & Quimby
Attys.

UNITED STATES PATENT OFFICE.

EDWARD E. MURPHY, OF BOSTON, MASSACHUSETTS.

APPARATUS FOR CONCENTRATING VINEGAR.

SPECIFICATION forming part of Letters Patent No. 574,930, dated January 12, 1897.

Application filed February 24, 1896. Serial No. 580,319. (No model.)

*To all whom it may concern:*

Be it known that I, EDWARD E. MURPHY, of Boston, in the county of Suffolk and State of Massachusetts, have invented certain new and useful Improvements in Apparatus for Concentrating Vinegar and other Acids, of which the following is a specification.

This invention has for its object to provide means for economically and effectively separating water from acid liquids, such as vinegar, to the end that the acid constituents may be concentrated, so that the acid may be economically shipped, its bulk and weight reduced by the elimination of the pure water contained in it, while by adding an equal quantity of water when the acid is ready for use it is restored to its original condition.

The invention consists in an acid-concentrator comprising a receptacle for the acidulous liquid to be treated and a freezing apparatus arranged to act upon the contents of the upper portion of the receptacle, the lower portion of the receptacle being unaffected by said apparatus and provided with a suitable outlet, the freezing apparatus acting to congeal the water in the upper portion of the receptacle and to force the acid portions downwardly until the desired concentration is effected, after which the concentrated acid and the ice are separately removed.

Figure 1:
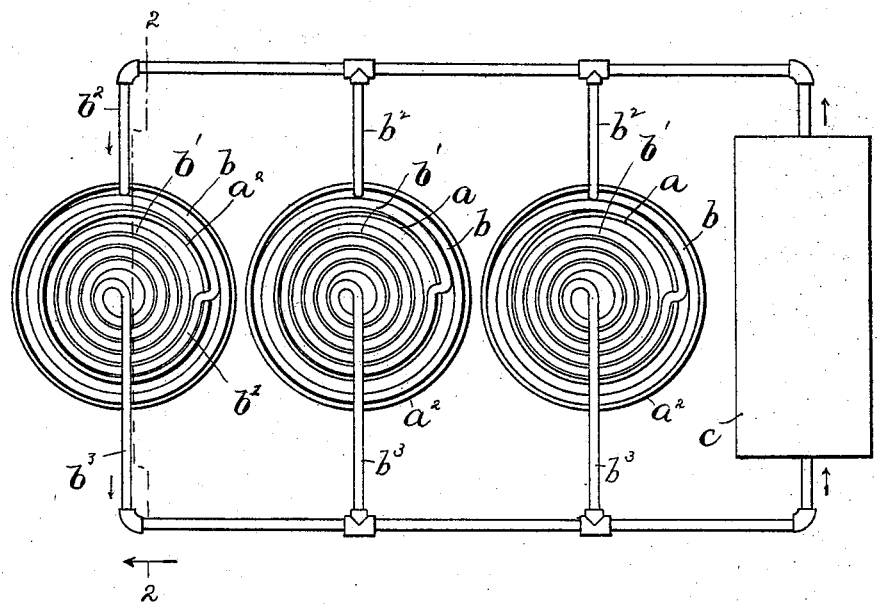
Figure 2:
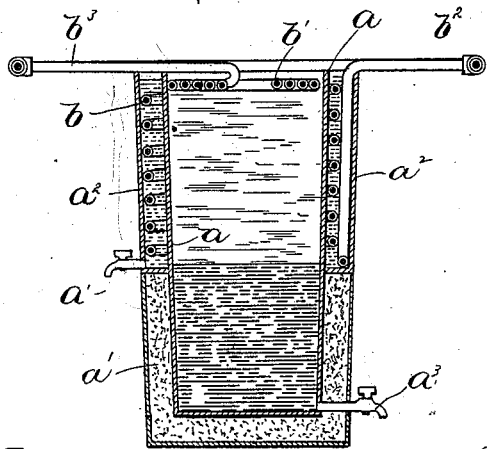
Figure 3:
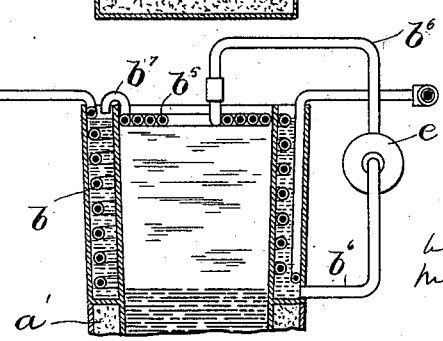

Of the accompanying drawings, forming a part of this specification, Figure 1 represents a plan view of an apparatus embodying my invention. Fig. 2 represents a section on line 2 2 of Fig. 1. Fig. 3 represents a section similar to Fig. 2, showing certain differences of construction hereinafter described.

The same letters of reference indicate the same parts in all the figures.

In the drawings, $a$ represents a tank or receptacle adapted to contain a body of acid liquid, such as vinegar. The upper portion of the contents of said receptacle are subjected to the action of a refrigerating or freezing apparatus, which is adapted to act only on the contents of the upper portion, the contents of the lower portion being unaffected by said apparatus, so that the freezing action takes place in the upper portion of the receptacle and separates the pure water from the acid, the latter being forced downwardly into the lower part of the receptacle, which extends below the freezing apparatus, so that it is out of the influence thereof and is or may be additionally protected by an insulating-jacket $a'$, consisting of any suitable material which is a non-conductor of heat.

The freezing apparatus is preferably constructed as follows: A jacket $a^2$ surrounds the upper portion of the receptacle $a$ and is adapted to contain a non-congealable liquid, such as brine. In said jacket is placed a pipe which communicates with a receptacle containing a refrigerating agent, such as anhydrous ammonia, which may be admitted in small quantities into the pipe through an expansion-valve, the ammonia expanding into a gas and rapidly absorbing heat from anything surrounding it. The other end of said pipe communicates with a suitable compressor, which causes a circulation of the gas through the pipe, compresses it preparatory to its condensation into liquid form in accordance with a well-known system of chemical refrigeration. A portion of the said pipe is here shown as disposed in the form of a helical coil $b$ in the jacket $a^2$, while another portion is disposed in the form of a spiral coil $b'$, which is arranged in a horizontal plane in the upper portion of the receptacle $a$, the coil $b$ acting through the walls of the receptacle upon the liquid therein, freezing inwardly toward the center of the receptacle, while the coil $b'$ acts upon the upper surface of the body of liquid, freezing the same downwardly. The coil $b$ is supplied by a portion $b^2$ of the pipe, the gas passing from the coil $b$ into and through the coil $b'$ and being conducted therefrom by a portion $b^3$ of the pipe.

The coils $b$ and $b'$ form a conduit of the freezing apparatus arranged to act on the surface of the liquid and to a predetermined point down the sides thereof, thereby restricting the formation of ice to the proper depth without depending entirely on the insulating-jacket.

The operation is as follows: The receptacle $a$, being charged with vinegar or other acidulous liquid to be concentrated, the refrigerating liquid is expanded into gas in the pipe and caused to circulate through the same, the water in the upper portion of the receptacle being thus rapidly converted into ice, while the acid is displaced and forced into the lower portion of the receptacle, where it finally becomes highly concentrated. After the concentration has reached a sufficient point the concentrated liquid is drawn off through a faucet $a^3$ in the lower part of the receptacle, the ice being removed in any suitable way. The concentrated acid may now be shipped or stored, and when required for use can be converted into its previous condition simply by the addition of the same amount of water that was converted into ice.

In Fig. 1 I show a plurality of receptacles $a$, the refrigerating-pipes of which are connected in a series with the condenser and compressor, which are not shown, but may be supposed to be located in the casing $c$.

In Fig. 3 I show the horizontal coil, which acts upon the upper surface of the liquid in the receptacle, as removable from the receptacle to permit the convenient removal of the ice. Said coil, which is here lettered $b^5$, is not connected with the coil $b$ in the jacket $a^2$, but receives the chilled liquid from the said jacket through a pipe $b^6$, the liquid being returned to the jacket from the delivering end of the coil $b^5$ through a pipe $b^7$. A pump $e$ is connected with the pipe $b^6$ and causes a circulation of the liquid through said pipe and into and through the coil $b^5$, said liquid being reduced to a very low temperature by the action of the coil $b$. Hence it serves as an efficient freezing agent in the coil $b^5$.

The supply and discharge pipes of the coil $b^5$ may be detachably connected therewith or may be of flexible construction, the object in either case being to permit the ready removal of the coil $b^5$ from the receptacle, to the end that the ice may be conveniently removed.

I claim—

1. An acid-concentrator comprising a liquid-receptacle and a freezing apparatus having a conduit extending over the surface and surrounding substantially the upper half of the receptacle, the lower portion of the receptacle being unaffected by said apparatus and provided with an outlet.

2. An acid-concentrator comprising a liquid-receptacle, a freezing apparatus having a conduit arranged to act on the surface and sides of the contents of the upper portion of the receptacle, and an insulating-jacket which protects the contents of the lower portion of said receptacle.

3. An acid-concentrator comprising a liquid-receptacle, a jacket surrounding the upper portion of the receptacle and adapted to contain a non-congealable liquid, a refrigerating-coil in said jacket, and a horizontal refrigerating coil or casing arranged to act on the upper surface of the contents of the receptacle.

4. An acid-concentrator comprising a liquid-receptacle, a jacket surrounding the upper portion of the receptacle and adapted to contain a non-congealable liquid, a refrigerating-coil in said jacket, a movable refrigerating coil or casing adapted to enter the upper portion of the liquid-receptacle, and connections between said movable coil and the jacket, said connections including a pump whereby the non-congealable liquid in the jacket may be circulated through the movable coil.

In testimony whereof I have signed my name to this specification, in the presence of two subscribing witnesses, this 14th day of February, A. D. 1896.

EDWARD E. MURPHY.

Witnesses:
C. F. BROWN,
A. D. HARRISON.